(12) United States Patent
Smith et al.

(10) Patent No.: US 7,704,563 B2
(45) Date of Patent: Apr. 27, 2010

(54) METHOD OF APPLYING SILANE COATING TO METAL COMPOSITION

(75) Inventors: Charles Smith, Conway, AR (US); Max Sorenson, Salt Lake City, UT (US); William J. Van Ooij, Fairfield, OH (US); Ramakrishna Nookala, Greenville, SC (US); Kevin Williams, Benton, AR (US)

(73) Assignees: The University of Cincinnati, Cincinnati, OH (US); Ecosil Technologies LLC, Cincinnati, OH (US)

( * ) Notice: Subject to any disclaimer, the term of this patent is extended or adjusted under 35 U.S.C. 154(b) by 829 days.

(21) Appl. No.: 11/366,235

(22) Filed: Mar. 2, 2006

(65) Prior Publication Data

US 2007/0059448 A1    Mar. 15, 2007

Related U.S. Application Data

(60) Provisional application No. 60/715,424, filed on Sep. 9, 2005.

(51) Int. Cl.
*B05D 1/18* (2006.01)
(52) U.S. Cl. .............. 427/434.6; 427/434.2; 427/430.1; 427/435; 152/451
(58) Field of Classification Search .............. 427/430.1, 427/435, 327
See application file for complete search history.

(56) References Cited

U.S. PATENT DOCUMENTS

| | | | |
|---|---|---|---|
| 5,108,793 A | 4/1992 | van Ooij et al. |
| 5,200,275 A | 4/1993 | van Ooij et al. |
| 5,204,219 A | 4/1993 | van Ooij et al. |
| 5,292,549 A | 3/1994 | van Ooij et al. |
| 5,322,713 A | 6/1994 | van Ooij et al. |
| 5,326,594 A | 7/1994 | Sabata et al. |
| 5,433,976 A | 7/1995 | van Ooij et al. |
| 5,455,080 A | 10/1995 | van Ooij |
| 5,478,655 A | 12/1995 | Sabata et al. |
| 5,498,481 A | 3/1996 | van Ooij |
| 5,532,314 A | 7/1996 | Sexsmith |
| 5,539,031 A | 7/1996 | van Ooij |
| 5,750,197 A | 5/1998 | van Ooij et al. |

(Continued)

FOREIGN PATENT DOCUMENTS

DE    10015308 A1    10/2001

(Continued)

OTHER PUBLICATIONS

International Search Report and Written Opinion of the International Searching Authority, mailed Mar. 1, 2007.

(Continued)

*Primary Examiner*—David Turocy
(74) *Attorney, Agent, or Firm*—Wood, Herron & Evans, L.L.P.

(57) ABSTRACT

Organofunctional silanes are applied to metal surfaces using an oil bath. Metal is immersed in an oil bath containing approximately 2% silane. In a preferred embodiment, the metal is a tire cord. The silane can either be hydrolyzed or unhydrolyzed. The hydrolyzed silanes can be in combination with a water dispersible resin. When the tire cord is coated with silane using the present method, it allows a tire to be formulated with lower sulfur levels and without cobalt.

13 Claims, 1 Drawing Sheet

U.S. PATENT DOCUMENTS

| | | | |
|---|---|---|---|
| 5,759,629 | A | 6/1998 | van Ooij et al. |
| 5,958,161 | A | 9/1999 | Grimberg et al. |
| 6,261,638 | B1 | 7/2001 | van Ooij et al. |
| 6,268,421 | B1 | 7/2001 | Dittrich et al. |
| 6,331,509 | B1 * | 12/2001 | Heimann et al. ............ 508/136 |
| 6,409,874 | B1 | 6/2002 | Van Der Aar et al. |
| 6,416,869 | B1 | 7/2002 | van Ooij et al. |
| 6,475,300 | B2 | 11/2002 | Shimakura et al. |
| 6,560,079 | B1 | 5/2003 | Hirsh et al. |
| 6,756,079 | B2 | 6/2004 | van Ooij et al. |
| 6,827,981 | B2 | 12/2004 | van Ooij et al. |
| 6,919,469 | B2 | 7/2005 | van Ooij et al. |
| 6,955,728 | B1 | 10/2005 | van Ooij et al. |
| 2004/0028829 | A1 * | 2/2004 | van Ooij et al. ............. 427/387 |
| 2004/0138072 | A1 * | 7/2004 | Levy .......................... 508/154 |
| 2005/0058843 | A1 | 3/2005 | van Ooij et al. |
| 2005/0079364 | A1 | 4/2005 | van Ooij et al. |
| 2005/0179011 | A1 | 8/2005 | van Ooij et al. |

FOREIGN PATENT DOCUMENTS

| | | |
|---|---|---|
| EP | 816420 A1 | 1/1998 |
| WO | WO 9914277 A1 * | 3/1999 |
| WO | WO 00/38844 A1 | 7/2000 |
| WO | WO 00/39356 A1 | 7/2000 |
| WO | WO 0038844 A1 * | 7/2000 |
| WO | 2004009717 | 1/2004 |
| WO | WO 2005/035634 A2 | 4/2005 |

OTHER PUBLICATIONS

Jang J, Kim K, Corrosion Protection of Epoxy-Coated Steel Using Different Silane Coupling Agents, Journal of Applied Polymer Science, vol. 71, 585-593 (1999).

Jayaseelan SK, van Ooij WJ, Rubber-To-Metal Bonding by Silanes, pp. 1-14, Proceedings of Rubber Bonding 2000 Conference, May 15-16, 2000.

van Ooij WJ, Jayaseelan SK, Bonding Metals to Rubber Using functional and Nonfunctional Silanes, 6 pp., Extended abstract of paper presented at Adhesion 99', Cambridge, UK, Sep. 15-17, 1999.

van Ooij WJ, van der Aar CPJ, Roseboom F, Bantjes A, Bonding rubber to Metals by Organofunctional and Non-Functional Silanes, 3 pp., Extended Abstract of Paper Presented at Euradh '98—4th European Conference on Adhesion, WCARP-1—1st World Congress on Adhesion and Related Phenomena, Garmisch-Partenkirchen, Germany, Sep. 6-11, 1998.

van Ooij WJ, Rubber-Brass Bonding, pp. 1-22 and 8 sheets of Figures, Chapter in Rubber Handbook RAPRA Technology, 1999.

van Ooij WJ, Zhu DQ, Prasad G, Jayaseelan S, Fu Y, Teredesai N., Silane Based Chromate Replacements for Corrosion Control, Paint Adhesion, and Rubber Bonding, pp. 386-396, Surface Engineering, vol. 6, No. 5, 2000.

van Ooij WJ, Jayaseelan SK, Stacy M, The Use of Organofunctional Silanes for Bonding Rubber to Metals, pp. 1-6, Paper to be presented at RubTech Expo 2002, New Delhi, India, Nov. 28-30, 2002.

* cited by examiner

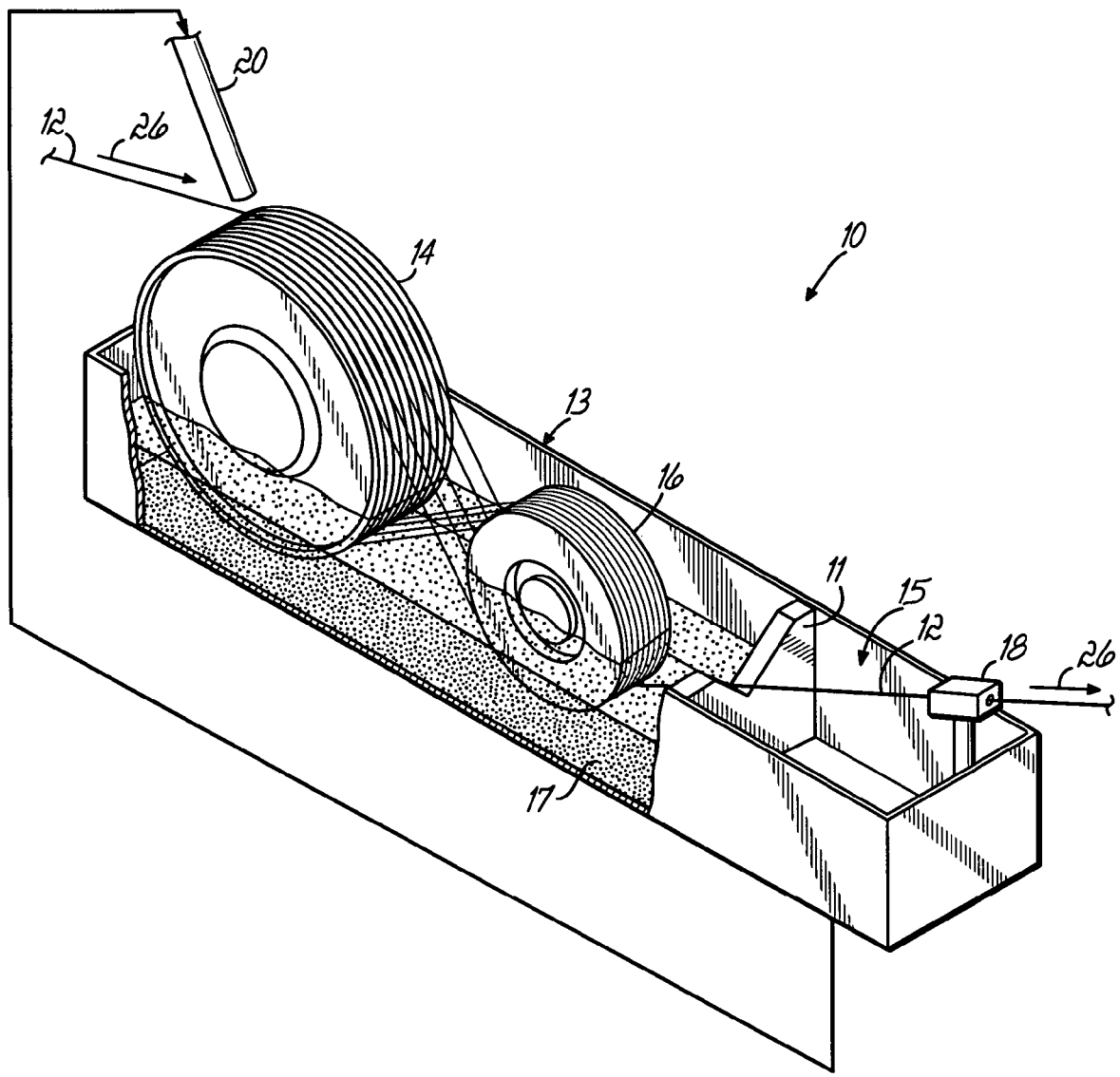

METHOD OF APPLYING SILANE COATING TO METAL COMPOSITION

RELATED APPLICATIONS

This application is related to provisional application 60/715,424, filed Sep. 9, 2005 the disclosure of which is hereby incorporated by reference.

BACKGROUND OF THE INVENTION

Silanes are applied to metal surfaces for several purposes including corrosion resistance and adhesion promotion. As an example, steel tire cord must adhere to the rubber in order to function properly. Steel does not bond well to rubber. To improve adhesion, the steel tire cord has been coated with a layer of brass. During the vulcanization process, the rubber forms a chemical bond with the brass. This rubber/metal bond is formed only with sulfur vulcanized rubber which requires a relatively high sulfur level, greater than 4 phr, as well as certain accelerators, i.e., a delayed action sulfonamide and cobalt in the form of cobalt naphthenate to achieve proper cure and good adhesion, as well as zinc oxide. The cobalt improves the stability of the rubber/brass bond. However, it also has a negative effect on the stability of the rubber network in that it accelerates reversion in the presence of oxygen at elevated temperatures. The increased sulfur and cobalt are believed to be necessary in order to achieve a satisfactory bond between the tire cord and the rubber.

It has been proposed to treat tire cord with various silane compositions in order to improve adhesion. This is disclosed, for example, in van Ooij U.S. Pat. No. 6,416,869; U.S. Pat. No. 6,756,079; and U.S. Pat. No. 6,919,469. The processes disclosed in these patents have various problems. One primary problem is the efficient application of the silane onto the tire cord. Some of these applications require that the silane be baked onto the tire cord in order for adequate adhesion.

Silane coatings are also applied to other forms of metals. They may be applied in aqueous solution, or suspension, or dissolved in a volatile solvent.

SUMMARY OF THE INVENTION

The present invention is premised on the realization that metal such as tire cord can be coated with a silane coating by running the metal through an oil bath containing a small percentage of silane. Excess material is simply wiped off using an air wipe or other similar device. With respect to coating tire cord, this is advantageous because the tire cord normally must pass through an oil bath during processing.

Any organo-functional silane can be employed. Such silanes are known to improve adhesion and prevent corrosion. For tire cords, the silane can be any organosilane that improves rubber/metal adhesion. These can include, for example, vinylsilanes, aminosilanes, polysulfidesilanes, as well as blends of organosilanes. For sulfur cure rubber systems the silane will be a blend of an amino silane and a polysulfide silane.

This, in turn, allows the rubber formulation, in particular the skim rubber formulation, to have less sulfur and no cobalt or zinc oxide, thereby improving the performance characteristics, such as heat aging, of the formed tire. This also significantly reduces the cost of the rubber formulation.

This method can be used to coat any type of metal, including brass, aluminum, steel and galvanized metal.

The objects and advantages of the present invention will be further appreciated in light of the following detailed description and drawing, in which:

BRIEF DESCRIPTION OF THE DRAWINGS

The FIGURE is a diagrammatic depiction, partially broken away, of the apparatus used to coat tire cord.

DETAILED DESCRIPTION OF THE INVENTION

According to the present invention, metal is coated with an organofunctional silane utilizing an oil bath containing the silane. The organosilane can be any organosilane. These may be added to provide corrosion resistance or as an adhesion promoter, in particular a metal-rubber adhesion promoter. In a preferred embodiment, the metal is a wire, and in particular steel or brass coated steel tire cord. The rubber can be any rubber that incorporates metal such as tires and conveyor belts.

Typical organofunctional silanes used in these applications include vinyl silanes, aminosilanes, and polysulfidesilanes, as well as mixtures thereof. Such silanes are disclosed in U.S. Pat. No. 6,416,869; U.S. Pat. No. 6,756,079; PCT application WO2004/009717; pending application U.S. 2005/0058843; and U.S. Pat. No. 6,919,469, the disclosures of which are hereby incorporated by reference.

One preferred silane coating composition for sulfur cured rubber systems is a blend of a bis-silyl amino silane and a bis-silyl polysulfur silane, with the ratio of bis-silyl amino silane to bis-silyl polysulfur silane from about 1:10 to about 10:1, preferably 1:3, by weight.

The preferred bis-silyl aminosilanes which may be employed in the present invention have two trisubstituted silyl groups, wherein the substituents are individually chosen from the group consisting of alkoxy, aryloxy and acyloxy. Thus, these bis-silyl aminosilanes have the general structure:

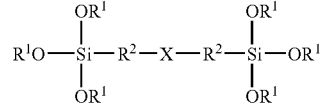

wherein each $R^1$ is chosen from the group consisting of: $C_1$-$C_{24}$ alkyl (preferably $C_1$-$C_6$ alkyl), and $C_2$-$C_{24}$ acyl (preferably $C_2$-$C_4$ acyl). Each $R^1$ may be the same or different, however, in the hydrolyzed silane solutions, at least a portion (and preferably all or substantially all) of the $R^1$ groups are replaced by a hydrogen atom. Preferably, each $R^1$ is individually chosen from the group consisting of: ethyl, methyl, propyl, iso-propyl, butyl, iso-butyl, sec-butyl, ter-butyl and acetyl.

Each $R^2$ in the aminosilane(s) may be a substituted or unsubstituted aliphatic group, or a substituted or unsubstituted aromatic group, and each $R^2$ may be the same of different. Preferably, each $R^2$ is chosen from the group consisting of: $C_1$-$C_{10}$ alkylene, $C_1$-$C_{10}$ alkenylene, arylene, and alkylarylene. More preferably, each $R^2$ is a $C_1$-$C_{10}$ alkylene (particularly propylene).

X may be:

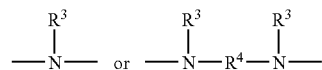

wherein each $R^3$ may be a hydrogen, a substituted or unsubstituted aliphatic group, or a substituted or unsubstituted aromatic group, and each $R^3$ may be the same or different. Preferably, each $R^3$ is chosen from the group consisting of hydrogen, $C_1$-$C_6$ alkyl and $C_1$-$C_6$ alkenyl. More preferably, each $R^3$ is a hydrogen atom.

Finally, $R^4$ in the aminosilane(s) may be a substituted or unsubstituted aliphatic group, or a substituted or unsubstituted aromatic group. Preferably, $R^4$ is chosen from the group consisting of: $C_1$-$C_{10}$ alkylene, $C_1$-$C_{10}$ alkenylene, arylene, and alkylarylene. More preferably, $R^4$ is a $C_1$-$C_{10}$ alkylene (particularly ethylene).

Exemplary preferred bis-silyl aminosilanes which may be used in the present invention include bis-(trimethoxysilylpropyl) amine (which is sold under the tradename Silquest® A-1170 by GE Silicones); and bis-(trimethoxysilylpropyl) ethylene diamine.

The preferred bis-silyl polysulfur silanes which may be employed in the present invention include:

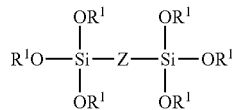

wherein each $R^1$ is as described before. In the hydrolyzed silane solutions of the present invention, at least a portion (and preferably all or substantially all) of the $R^1$ groups are replaced by a hydrogen atom. Z is -Q-$S_x$-Q-, wherein each Q is an aliphatic (saturated or unsaturated) or aromatic group, and x is an integer of from 2 to 10. Q within the bis-functional polysulfur silane can be the same or different. In a preferred embodiment, each Q is individually chosen from the group consisting of: $C_1$-$C_6$ alkyl (linear or branched), $C_1$-$C_6$ alkenyl (linear or branched), $C_1$-$C_6$ alkyl substituted with one or more amino groups, $C_1$-$C_6$ alkenyl substituted with one or more amino groups, benzyl, and benzyl substituted with $C_1$-$C_6$ alkyl.

Particularly preferred bis-silyl polysulfur silanes include bis-(triethoxysilylpropyl) sulfides having 2 to 10 sulfur atoms. Such compounds have the following formula:

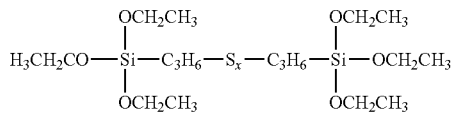

wherein x is an integer of from 2 to 10. One particularly preferred compound is bis-(triethoxysilylpropyl) tetrasulfide (also referred to as bis-(triethoxysilylpropyl) sulfane, or "TESPT"). Commercially-available forms of TESPT (such as Silquest® A-1289, available from GE Silicones), however, are actually mixtures of bis-(triethoxysilylpropyl) sulfides having 2 to 10 sulfur atoms. In other words, these commercially-available forms of TESPT have a distribution of sulfide chain lengths, with the $S_3$ and $S_4$ sulfides predominating.

Silanes can be either hydrolyzed or unhydrolyzed, and can be utilized in combination with an aqueous resin dispersion. Typically, the silanes are not hydrolyzed when combined with the resin dispersion, as well as when added directly to the oil bath as described below. However, the silanes tend to hydrolyze through exposure to air.

For use in the present invention a variety of water dispersible resins can be employed including epoxy resins, novolac resins, acrylate resins, and polyurethane resins. In addition to the water dispersible resins, neat resins can also be used that are compatible with the oil and the selected silane. The water borne dispersion of polymeric resin may also include a certain percentage by volume of an organic solvent, such as an alcohol (e.g. ethanol), as well as surfactants used to keep the resin in solution or dispersed in the water. In one example, the dispersion includes about 50% by volume of an n-butoxy ethanol.

The resin dispersion may be purchased commercially and can include, for example, Epi-rez 5522-WY-55, a 55% solids dispersion of a modified polyfunctional epoxy resin in water and 2-propoxy ethanol, (available from Resolution Performance LLC), or Epi-rez WD 510, a water reducible epoxy resin, or ECO CRYL 9790, an aqueous acrylic with 42% solid dispersed in 45% water, 7% 2-propoxy ethanol, 3% xylene and 3% ethanamine.

The silane is applied to the metal in an oil bath. If silane is used without resin the silane is added directly to the oil bath. The concentration of the silane should be from about 0.5% to about 10% by weight, preferably about 2%, with 6% most preferred. The oil should comprise 80% or more of the bath (by weight) with at least 95% preferred. If the silane is combined with an aqueous dispersion of a resin, the ratio of resin dispersion (50-55 active) to silane by weight should be from about 1:5 to about 5:1, with 1:1 preferred. It is generally desirable to minimize the amount of resin, using only enough to insure the silane is dispersed in the mixture. If added, the silane is mixed with the resin dispersion, sufficient dispersion is added to the oil bath to provide 0.5-10% by weight silane in the bath, with 6% by weight preferred.

The oil should be a non VOC lubricating oil and can be any mineral, animal or vegetable based oil. Oil includes synthetic lubricants such as polyglycols, dibasic acid esters, chlorofluoro carbons, silicone oils, neopentyl polyol esters, and polyphenyl ethers. Preferably, the oil will be a mineral oil, such as a paraffinic or naphthenic lubricating oil, having a viscosity such that it flows at application temperature. Any oil which can be used in a tire cord manufacturing process can be used in the present invention. One such oil is a heavily hydrotreated naphthenic having a viscosity of 60 SUS @ 100° F. CAS 647-52-5.

Prior to coating the metal in the oil bath, the metal should be cleaned with an acid or alkaline cleaner and rinsed with deionized water, preferably, an alkaline cleaner. The silane oil mixture can be applied to the metal surface by any common method such as spraying, brushing, emersion coating, curtain coating, and the like.

When the metal is wire, such as tire cord, it can be coated with an apparatus such as that shown in the FIGURE. The FIGURE shows an exemplary coating apparatus 10 adapted to coat tire cord 12 with oil 17 containing the silane. As shown, the apparatus 10 is a trough which is divided by barrier 11 into first and second sections 13 and 15. First section 13 includes first and second grooved rollers 14 and 16. The cord 12 runs back and forth in grooves in rollers 14 and 16 and is thus repeatedly submersed in the oil 17 in first section 13. The cord 12 moving in the direction of arrows 26 then passes through an air wipe 18 which forces off excess oil and coating material. This excess is then taken from second section 15 of apparatus 10 and redirected through line 20 and redeposited back on roller 14 into the first section 13 of the coating trough 10.

The temperature of the oil bath will generally be about room temperature (50-120° F.), but can be raised up to the boiling point of the oil. The cord should be in oil for 0.1 to 10 seconds, preferably 1-2 seconds. This is controlled by controlling the path through the oil as well as the speed of cord 12.

After being coated, the cord is simply rolled onto a spool and then can subsequently be used to form belting for tires, conveyer belts, and the like. Typical rubber formulations are disclosed in U.S. Pat. No. 6,919,469, the disclosure of which is incorporated herein by reference.

To test the rubber adhesion between the silane coated cord and sulfur cured rubber, a series of tests were performed. These tests used hydrolyzed and unhydrolyzed silanes and used silanes with and without a resin coating.

Materials used: Tire cords, amino silane A1170, Sulfane A1289, Epi-rez 3510 W-60, Epi-rez WD 510, Lubesnap 60 lubricant.

Surface treatment: 1M NaOH dip, air dry, DI rinse, air dry, 1M NaOH dip, air dry, DI rinse, air dry.

Rubber used: The Test compounds include a typical tire rubber formulation that has excellent adhesion to brass incorporating cobalt naphthenate and a compound used for test purposes that has no adhesion to brass, i.e., without cobalt naphthenate.

Vulcanization parameters: 172° C. for 16 minutes at 43 kg/m$^2$.

Analytical technique: Adhesion pull out testing in tension.

Epi-rez WD 510 contains 100% solid with greater than 90% bisphenol A epoxy resin and less than 10% polymeric dispersant. Epi-rez 3510 W-60 is an aqueous dispersion of bisphenol A epoxy resin, which contains 61% solid in water. The below matrix describes the physical constituents of the hydrolyzed silane mixtures.

TABLE 1

Description of the hydrolyzed silanes

| Silane mixture | Neat A1170 (ml) | Neat A1289 (ml) | Acetone (ml) | Water (ml) |
|---|---|---|---|---|
| 10% A1170 | 10 | 0 | 0 | 90 |
| 62.5% A1289 | 0 | 50 | 15 | 15 |
| 43.5% A1289 | 0 | 50 | 50 | 15 |

The following tests were conducted to study the difference in performance between the oil based and water based resin silane mixtures.

The below listed values are measured on a 100 g total weight basis. The wires were cleaned as previously described. A 1:3 ratio was maintained between A1170 and A1289. The wires after being cleaned were coated with the above silane mixtures and cured in rubber and tested under tension for adhesion.

TABLE 2

Description of the silane mixtures

| Silane mixture | A1170 (g) | A1289 (g) | Epi-rez 3510 W-60 (g) | Lubricant | Water | Drying°/minutes |
|---|---|---|---|---|---|---|
| A | 0.25 | 0.75 | 1.0 | NA | 98 | 105/3 |
| B | 0.25 | 0.75 | 1.0 | 98 | NA | NA |
| C | 0.25 (10%) | 0.75 (43.5%) | 1.0 | 98 | NA | NA |
| D | 0.25 (10%) | 0.75 (62.5%) | 1.0 | 98 | NA | NA |
| E | 0.25 | 0.75 | 1.0 | 98 | NA | 105/3 |
| F | 0.25 (10%) | 0.75 (43.4%) | 1.0 | 98 | NA | 105/3 |
| G | 0.25 (10%) | 0.75 (62.5%) | 1.0 | 98 | NA | 105/3 |

The pull out force for the respective samples and an uncoated control were as follows:

| Control | 12.5 kg |
|---|---|
| A | 17.0 kg |
| B | 21.0 kg |
| C | 21.0 kg |
| D | 17.0 kg |
| E | 27.3 kg |
| F | 22.0 kg |
| G | 20.5 kg |

The matrix listed below assesses the effect of cleaning and drying on the oil based WD 510 resin silane system. The neat silane concentration was 20% by weight and the ratio of A1170 to A1289 is 1:3. Equal parts of A1170 and WD 510 were added. The tire cords were cured in the experimental rubber and tested under tension for adhesion.

TABLE 3

|  | Dried | Not Dried |
|---|---|---|
| Cleaned | 1 | 2 |
| Not cleaned | 3 | 4 |

The oil based silane resin mixture B works better than the water based resin silane mixture A. Both these mixtures offered the same rubber coverage.

Silane mixture D is the best performing mixture of the oil based resin silane system in terms of pull out force and rubber coverage. It contains hydrolyzed A1289 and A1170. Stoichiometric quantity of water was added to just hydrolyze the A1289. Acetone was added in equal parts to water.

Drying had a positive effect on mixture B, no effect on mixture C and a negative effect on mixture D in terms of the pull out force values. However, rubber coverage dropped drastically as a result of drying for the oil based resin silane mixtures.

With respect to the oil based WD 510 resin silane system, the combination of cleaning and not drying gave the best adhesion value. Drying decreases the pull out force by 18% and increases the rubber coverage by almost 50% for this system.

Based on this testing, cleaning affects the pull out value positively. However, higher silane concentrations not only gave lower pull out values, but cleaning had little or no effect on the adhesion values. Lower silane concentrations gave the best adhesion values. For sample #1, cleaning improved the adhesion value by 190%.

Those samples that were not cleaned had 0% rubber coverage. However, among the cleaned samples, silane mixture #1 gave the maximum coverage. The rubber coverage dropped off at higher silane concentrations.

The effect of cleaning on the performance of the oil based resin silane mixture was also tested. The below listed values are measured on a 100 g total weight basis. A 1:3 ratio was maintained between A1170 and A1289. Mixtures I, III and V have equal parts resin and A1170. Mixtures II, IV and VI have equal parts resin and the total silane concentration. The wires were cleaned as described and were then coated with the below silane mixtures. The uncleaned wires were also coated with these silane mixtures. These wires were then cured in the rubber compound and tested under tension for adhesion.

The cleaned wires were coated with the above silane mixtures and cured in the rubber compound and later tested in tension for adhesion.

Hydrolyzed mixtures 6 and 8 gelled when the respective components were mixed. As such, they were not tested.

Neat silanes performed better than hydrolyzed silanes except for mixture #4 where the hydrolyzed silane outperformed the neat silane by 50% with respect to pull out force.

TABLE 4

Constituents of the different oil based WD 510 resin silane mixture

| Silane mixture | Silane concentration (%) | A1170 (g) | A1289 (g) | Resin WD 510 (g) | Lubricant (g) | Cleaned Pullout Force (kg) | Uncleaned Pullout Force (kg) |
|---|---|---|---|---|---|---|---|
| I | 1 | 0.25 | 0.75 | 0.25 | 98.75 | 29.3 | 10.2 |
| II | 1 | 0.25 | 0.75 | 1.0 | 98 | 25.8 | 11.5 |
| III | 5 | 1.25 | 3.75 | 1.25 | 93.75 | 27.3 | 10.3 |
| IV | 5 | 1.25 | 3.75 | 5.0 | 90 | 16.3 | 13 |
| V | 5 | 1.25 | 3.75 | 5.0 | 90 | 17 | 17.6 |
| VI | 20 | 5 | 15 | 20 | 60 | 12 | 13.9 |
| Control | | | | | | 12 | 11.3 |

To assess the difference in performance between the oil based neat and hydrolyzed silane resin mixture, the formulations in Table 5 and Table 6 were tested.

Silane mixture #1 was the best performer among the 16 different solutions. Among the hydrolyzed solutions, mixture #3 was the top performer.

To determine the effect of varying the ratio and concentration of neat and hydrolyzed silanes on the pull out values, the formulations shown in Table 7 and Table 8 were tested.

TABLE 5

Oil based neat silane-resin system

| Silane mixture | Silane concentration (%) | A1170 (g) | A1289 (g) | Resin WD 510 (g) | Lubricant (g) | Pullout Force (kg) |
|---|---|---|---|---|---|---|
| 1 | 1 | 0.25 | 0.75 | 0.25 | 98.75 | 29.3 |
| 2 | 1 | 0.25 | 0.75 | 1.0 | 98 | 25.8 |
| 3 | 5 | 1.25 | 3.75 | 1.25 | 93.75 | 27.3 |
| 4 | 5 | 1.25 | 3.75 | 5.0 | 90 | 16.3 |
| 5 | 10 | 2.5 | 7.5 | 2.5 | 87.5 | 17.6 |
| 6 | 10 | 2.5 | 7.5 | 10 | 80 | 13.9 |
| 7 | 20 | 5.0 | 15 | 5 | 75 | 16.4 |
| 8 | 20 | 5.0 | 15 | 20 | 60 | 15.7 |

TABLE 7

Oil based neat silane-resin system

| Silane mixture | Silane ratio | Silane concentration (%) | A1170 (g) | A1289 (g) | Resin WD 510 (g) | Lubricant (g) |
|---|---|---|---|---|---|---|
| I | 1:1 | 1 | 0.5 | 0.5 | 0.5 | 98.5 |
| J | 1:3 | 1 | 0.25 | 0.75 | 0.25 | 98.75 |
| K | 1:5 | 1 | 0.166 | 0.833 | 0.16 | 98.83 |
| L | 1:1 | 5 | 2.5 | 2.5 | 2.5 | 92.5 |
| M | 1:3 | 5 | 1.25 | 3.75 | 1.25 | 93.75 |
| N | 1:5 | 5 | 0.83 | 4.15 | 0.83 | 94.19 |

TABLE 6

Oil based hydrolyzed silane-resin system

| Silane mixture | Silane concentration (%) | A1170 (10% soln) (g) | A1289 (62.5% soln) (g) | Resin WD 510 (g) | Lubricant (g) | Pullout Force (kg) |
|---|---|---|---|---|---|---|
| 1H | 1 | 2.5 | 1.2 | 0.25 | 96.5 | 21.5 |
| 2H | 1 | 2.5 | 1.2 | 1 | 95.3 | 19.7 |
| 3H | 5 | 12.5 | 6.0 | 1.25 | 80.25 | 25.8 |
| 4H | 5 | 12.5 | 6.0 | 5 | 76.5 | 24.2 |
| 5H | 10 | 25 | 12 | 2.5 | 60.5 | 10.7 |
| 6H | 10 | 25 | 12 | 10 | 53 | N/A |
| 7H | 20 | 50 | 24.2 | 5 | 20.8 | 15.6 |
| 8H | 20 | 50 | 24.2 | 20 | 5.8 | N/A |

TABLE 8

| | | | Oil based hydrolyzed silane-resin system | | | |
|---|---|---|---|---|---|---|
| Silane mixture | Silane ratio | Silane concentration (%) | A1170 (10% soln) (g) | A1289 (62.5% soln) (g) | Resin WD 510 (g) | Lubricant (g) |
| O | 1:1 | 1 | 5.0 | 0.8 | 0.5 | 93.7 |
| P | 1:3 | 1 | 2.5 | 1.20 | 0.25 | 96.05 |
| Q | 1:5 | 1 | 1.66 | 1.34 | 0.16 | 96.84 |
| R | 1:1 | 5 | 25 | 4.03 | 2.5 | 68.47 |
| S | 1:3 | 5 | 12.5 | 6.04 | 1.25 | 80.21 |
| T | 1:5 | 5 | 8.3 | 6.69 | 0.83 | 84.18 |

Control, hydrolyzed mixture #6 and hydrolyzed mixture #8 have zero rubber coverage. Highest rubber coverage is offered by both neat and hydrolyzed silane mixture #1. In other cases, neat silane mixtures offer more rubber coverage except in mixture #7 where the hydrolyzed mixture offers 125% more coverage than the neat solution.

An analysis of line speed to drying temperature indicated that maximum pull out force was achieved at about 4 m/min with a drying temperature of 140° C.

Thus, as shown, the present invention permits the application of a wide variety of different silane formulations onto metal surfaces using an oil. The applied silanes then function to improve adhesion and provide other attributes typically associated with a silane coating, such as corrosion inhibition. Applying the silane coating with an oil bath provides greater flexibility in applying the silane, allowing it to be incorporated in line with many different processes. Many different processes require an oil coating, therefore the application of silane can be accomplished without additional equipment. This is particularly the case when the metal being coated is tire cord. In such an application, the applied silane coating significantly improves the adhesion of the sulfur cured rubber to the tire cord while at the same time permitting the use of a rubber formulation that does not include a cobalt compound and has lower levels of sulfur, thereby improving the overall physical characteristics of the rubber itself.

This has been a description of the present invention along with the preferred method of practicing the present invention. However, the invention itself should only be defined by the appended claims, WHEREIN

We claim:

1. A method of applying a silane coating onto a metal tire cord comprising passing said metal tire cord through a bath containing an oil mixture, said oil mixture comprising a blend of oil and an organofunctional silane wherein said oil comprises at least about 80% by weight of said bath.

2. The method claimed in claim 1 wherein said metal tire cord is drawn through said bath.

3. The method claimed in claim 2 wherein said organofunctional silane is dispersed in a resin.

4. The method claimed in claim 2 wherein said metal tire cord is maintained in said bath for a period of at least about 1 second.

5. The method claimed in claim 1 wherein said silane includes an amino silane.

6. The method claimed in claim 1 wherein said organofunctional silane comprises at least about 2% by weight of said oil bath.

7. The method claimed in claim 1 wherein said organofunctional silane is a mixture amino silane and polysulfur silane.

8. The method claimed in claim 7 wherein said organofunctional silane mixture has a ratio by weight of amino silane:polysulfur silane of 1:3 to 3:1.

9. The method claimed in claim 1 wherein said organofunctional silane is unhydrolyzed.

10. The method claimed in claim 1 wherein said organofunctional silane is hydrolyzed and said solution further includes water.

11. The method claimed in claim 1 wherein said oil is a naphthenic lubricating oil.

12. The method claimed in claim 1 wherein said oil is a paraffinic lubricating oil.

13. The method claimed in claim 1 wherein said metal tire cord is cleaned with an alkaline cleaner before said silane is applied.

* * * * *